United States Patent
Shim et al.

(10) Patent No.: US 11,165,077 B2
(45) Date of Patent: Nov. 2, 2021

(54) METHOD OF OUTPUTTING A WATER LEVEL OF A CAPACITIVE LEVEL SENSOR FOR A WATER TRAP OF A FUEL CELL SYSTEM

(71) Applicants: HYUNDAI MOTOR COMPANY, Seoul (KR); KIA MOTORS CORPORATION, Seoul (KR)

(72) Inventors: Hyo Sub Shim, Suwon-si (KR); Hak Yoon Kim, Incheon (KR); Hyeon Seok Ban, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 238 days.

(21) Appl. No.: 16/436,260

(22) Filed: Jun. 10, 2019

(65) Prior Publication Data
US 2020/0168927 A1   May 28, 2020

(30) Foreign Application Priority Data
Oct. 23, 2018   (KR) .................. 10-2018-0126445

(51) Int. Cl.
*H01M 8/04492* (2016.01)
*G01F 23/26* (2006.01)
*G01F 25/00* (2006.01)

(52) U.S. Cl.
CPC ........ *H01M 8/04492* (2013.01); *G01F 23/26* (2013.01); *G01F 23/266* (2013.01); *G01F 25/0061* (2013.01); *H01M 2220/20* (2013.01)

(58) Field of Classification Search
CPC .. G01F 23/266; G01F 25/0061; G01F 23/263; G01F 23/26; H01M 2220/20; H01M 8/04492; H01M 8/04828; Y02E 60/10; Y02E 60/50
See application file for complete search history.

(56) References Cited

U.S. PATENT DOCUMENTS

2016/0087289 A1*  3/2016  Shim ................. H01M 8/04231
                                                      429/414
2018/0277867 A1*  9/2018  Son .................... H01M 8/04738

FOREIGN PATENT DOCUMENTS

JP              2014144240 A     8/2014

* cited by examiner

*Primary Examiner* — John Fitzgerald
*Assistant Examiner* — Truong D Phan
(74) *Attorney, Agent, or Firm* — Lempia Summerfield Katz LLC

(57) ABSTRACT

A method of measuring a water level in a water trap of a fuel cell system, the method including outputting a detected water level of a capacitive level sensor having a plurality of electrodes in the water trap. The method includes resetting a reference output value of each electrode and determining the water level depending on the speed at which water is introduced while detecting the water level in the water trap depending on an output value measured by the plurality of electrodes. Thereby, the influence of temperature and electrode differences is removed.

7 Claims, 7 Drawing Sheets

FIG. 2

| Situation | No water in upper/lower electrodes | Water is introduced into lower electrode | Water is filled in lower electrode and then water is positioned between upper/lower electrodes | Water is introduced -> water level is output |
|---|---|---|---|---|
| Image | 100T, 100B Water level | 100T, 100B Water level | Water level | Water level |
| Condition | Variation in output value of lower electrode <A; Variation in output value of upper electrode <A | Variation in output value of lower electrode ≥A; Variation in output value of upper electrode <A | Variation in output value of lower electrode <A; Variation in output value of upper electrode <A | Variation in output value of lower electrode <A; Variation in output value of upper electrode >A |

[FLOWCHART OF OUTPUT WHEN WATER LEVEL RISES]

[FLOWCHART OF OUTPUT WHEN WATER LEVEL DROPS]

< OUTPUT VALUE OF SENSOR DEPENDING ON WATER LEVEL >

METHOD OF OUTPUTTING A WATER LEVEL OF A CAPACITIVE LEVEL SENSOR FOR A WATER TRAP OF A FUEL CELL SYSTEM

CROSS-REFERENCE TO RELATED APPLICATION

This application claims under 35 U.S.C. § 119(a) the benefit of priority to Korean Patent Application No. 10-2018-0126445 filed on Oct. 23, 2018, the entire contents of which are incorporated herein by reference.

BACKGROUND

(a) Technical Field

The present disclosure relates to a method of outputting a detected or measured water level of a capacitive level sensor for a water trap of a fuel system. More particularly, it relates to a method of accurately detecting the actual water level via a capacitive level sensor installed in a water trap of a fuel cell system. The capacitive level sensor includes a plurality of electrodes disposed therein.

(b) Background Art

A fuel cell stack, which is a main component of a fuel cell system, is a type of apparatus for generating electric energy via a chemical reaction between oxygen in the air and hydrogen supplied from the outside.

In other words, the hydrogen supplied to the fuel cell stack is divided into hydrogen ions and electrons with a catalyst of a fuel electrode. The divided hydrogen ions are transferred to an air electrode through an electrolyte membrane. Continuously, oxygen supplied to the air electrode is combined with electrons transferred to the air electrode through an external wire to generate electric energy while generating water.

In such a reaction of the fuel cell stack, the gas output from an outlet of a fuel electrode of the stack includes a large amount of condensate transferred from the air electrode. In this regard, when the condensate is not smoothly discharged, the condensate is accumulated in the stack without change, thus impeding a hydrogen reaction. As a result, the output and driving safety of the stack are adversely affected, and thus, a water trap for removing the fuel electrode condensate is installed in the fuel cell system. Accordingly, water generated in the fuel cell stack falls downwards due to gravity, attributable to the design of the fuel cell stack. The water that falls downwards is collected in a water trap apparatus.

When the condensate collects in the water trap apparatus to a predetermined water level or greater, the condensate is discharged outside through a drain valve, or the like, installed at one end of the water trap. In other words, when the water generated from the fuel cell stack falls due to gravity and a predetermined amount of water or greater is stored in a water trap, water is detected by a maximum water level detection sensor and is discharged outside by opening a drain valve at a bottom portion of the water trap.

However, when a maximum water level of the water stored in the water trap apparatus is detected through a capacitive level sensor, if the temperature of the water trap is increased for any reason other than the increase in the amount of water, a capacitive level sensor may malfunction due to the high-temperature state. Accordingly, the measured water level inside the water trap may be detected as being higher than the actual water level, and a drain valve may be unnecessarily open.

When water is introduced into the water trap apparatus at a very slow speed, there may be a period in which a water level is not normally output. When the water level is affected by a temperature change, there is a problem since it is more difficult to measure the water level. In this case, there is the possibility that an increase in the water level is not appropriately detected, and accordingly, flooding may occur in a stack and the output of the stack may be degraded.

SUMMARY OF THE DISCLOSURE

In one aspect, the present disclosure provides a method of outputting a detected or measured water level of a capacitive level sensor for a water trap of a fuel system. The capacitive level sensor includes a plurality of electrodes. The method includes resetting a reference output value of each electrode and determining a water level depending on the speed at which water is introduced while a water level in the water trap is detected depending on an output value measured by the plurality of electrodes. Thereby, the influence of the temperature and the electrode differences is removed, and particularly, the level of water that is slowly introduced over a long time is detected.

In an embodiment, a method of outputting a detected or measured water level of a capacitive level sensor, including a plurality of electrodes for measuring capacitance, includes receiving an output value of each electrode and determining an initial water level in a water trap from the output value of each electrode, by a controller. The method further includes resetting a reference output value of each electrode to a current output value of each electrode, by the controller. The method so also includes checking output variation of each electrode depending on the reset reference output value, by the controller. The method further includes checking a maximum value $\Delta C_{max}$ among output variations of each electrode and comparing the maximum value $\Delta C_{max}$ among output variations of each electrode with a threshold value, by the controller. The method also includes outputting a corresponding electrode position as a water level when the maximum value $\Delta C_{max}$ among output variations of each electrode is greater than the threshold value, by the controller. The threshold value is differently set to a first threshold value when a water level in the water trap is relatively rapidly changed and set to a second threshold value when the water level in the water trap is relatively slowly changed.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein:

FIG. 2 is a diagram showing an output value of an electrode, that is, an output value between adjacent electrodes that are disposed at upper and lower portions based on the height of a water surface, according to an embodiment of the present disclosure;

DETAILED DESCRIPTION

Hereinafter, reference is made in detail to various embodiments of the present disclosure, examples of which are illustrated in the accompanying drawings and described below. While the disclosure is described in conjunction with various embodiments, it will be understood that the present description is not intended to limit the disclosure to those embodiments. These embodiments are provided so that this disclosure is thorough and complete, and will fully convey the concept of the disclosure to those of ordinary skill in the art.

Further, the terms such as "unit", "module", etc. disclosed in the specification mean units for processing at least one function or operation, which may be implemented by hardware, software, or a combination thereof A fuel cell system installed in a vehicle may broadly include: a fuel cell stack for generating electric energy; a fuel supply apparatus for supplying fuel (hydrogen) to the fuel cell stack; an air supply apparatus for supplying oxygen of the air as an oxidizing agent required for an electrochemical reaction to the fuel cell stack; a cooling system for removing reaction heat of the fuel cell stack out of the system to control the driving temperature of the fuel cell stack; a controller for adjusting opening/closing of a plurality of valves included in the fuel cell system; and the like.

Figure 1:
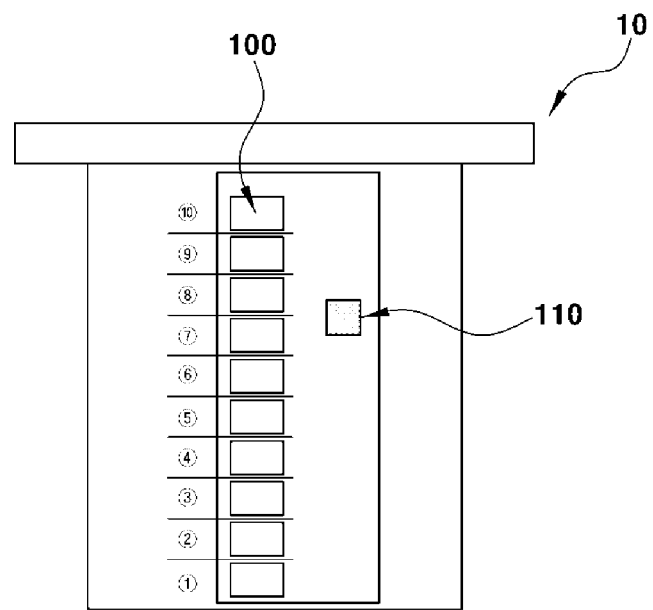
FIG. 1 is a diagram showing the configuration of a capacitive level sensor including a plurality of electrodes in a water trap according to an embodiment of the present disclosure.

Among the components of the fuel cell system, the configuration of a component to which water generated from the stack is discharged is described. In this regard, as shown in FIG. 1, a water trap 10, connected to the stack to collect condensate generated in the stack is described. Although not shown in FIG. 1, a drain valve may be present as a part of the fuel system and disposed at one end the water trap 10, such as at a lower end portion of the water trap 10 and may be connected to the outside.

The water trap 10 may be a component that temporarily stores the condensate generated in the stack and that then discharges the condensate outside once the drain valve is open. Water inside the water trap 10 may be discharged through the drain valve outside by gravity. However, the period or frequency for opening the drain valve may affect the efficiency of the entire fuel cell system. Thus, it may be important to open the valve at the exact point in time at which the drain valve actually needs to be open.

In other words, when water (condensate) is not present in the water trap 10, if the drain valve is open, hydrogen in the fuel cell system is unnecessarily discharged to the outside through the drain valve, which may adversely affect the fuel efficiency of a vehicle. In addition, even if a large amount of water is generated in the water trap 10, when the water is not timely discharged outside, the fuel cell system may be damaged due to excessive moisture and flooding of the stack.

Accordingly, a sensor for measuring a water level inside the water trap 10 may be disposed on one surface inside the water trap. The water trap 10 according to an embodiment of the present disclosure may include a capacitive level sensor. The capacitive level sensor includes a plurality of electrodes 100 and is disposed on one surface of an internal wall of the water trap.

In particular, the capacitive level sensor according to the present disclosure may be a general capacitive level sensor that includes a plurality of electrodes inside the sensor to collect 'n' pieces of capacitive data from the plurality of electrodes. Accordingly, when water is collected up to the height corresponding to each electrode in the capacitive level sensor, the capacitance of the corresponding electrode is changed. In this regard, the capacitive level sensor may be configured to measure a water level as variation in the capacitance. In other words, a variation in the output of the electrode is detected. In this embodiment, the output variation of the electrode may be determined as a difference between a current output value of the corresponding electrode and a predetermined reference output value of the corresponding electrode.

In addition, the capacitive level sensor according to an embodiment of the present disclosure may include a micro control unit (MCU) 110. The corresponding MCU 110 may collect a value (output value) of capacitance measured by each electrode 100 and values related thereto. The corresponding MCU 110 may control whether the drain valve is opened or closed based on the output value.

FIG. 1 is a diagram showing the configuration of a capacitive level sensor, including the plurality of electrodes 100, according to an embodiment of the present disclosure. Referring to FIG. 1, the capacitive level sensor according to the present disclosure may include the plurality of electrodes 100. The plurality of electrodes 100 may be disposed parallel to each other and may be disposed in one line in a gravity or vertical direction.

Regarding the plurality of electrodes 100, output values corresponding to the respective electrodes may be preset. The output value may be set to a value corresponding to the height of the bottom of the corresponding electrode relative to the bottom of the water trap 10. Accordingly, among the plurality of electrodes 100, an electrode disposed at a low position may have a relatively low output value, and an electrode disposed at a high position may have a relatively high output value. The plurality of electrodes 100 may constantly output different respective output values. In other words, the plurality of electrodes 100 may output values corresponding to the heights of the bottoms of the corresponding electrodes, as water levels, respectively (refer to FIG. 5).

Hereinafter, a method of outputting the measured or detected water level of a capacitive level sensor according to an embodiment of the present disclosure is described below with reference to FIGS. 2-4. In the method of outputting the water level of a capacitive level sensor according to an embodiment of the present disclosure, first, variation in an output value transmitted from the plurality of electrodes 100 may be measured. In detail, the variation X in an output value of the plurality of electrodes 100 may be measured at a predetermined period interval or may be continuously measured by the MCU 110 until the output value of a water level is updated. In addition, according to the present disclosure, the time point at which the variation X is measured once may be a short time that is determined as a predetermined time and may be a very short time period (interval). In other words, according to the present disclosure, variation X in the electrode output value during a predetermined time may be measured, and in this regard, may be repeatedly and periodically measured. In addition, according to the present disclosure, when the variation X is measured during a time period based on a specific condition (e.g., update of an output value of a water level), the variation X may be measured at a predetermined time interval.

Among a plurality of electrodes of the capacitive level sensor, as a contact area between an electrode and the air is reduced due to water on one electrode, the variation X in an electrode output value may be changed to a predetermined threshold value A or greater. In other words, the variation X in the electrode output value of the variation may be changed to the predetermined threshold value A or greater only when an area of the electrode, which is exposed to the air, is changed due to water.

On the other hand, in one electrode, when all surfaces of the electrode sink under water, in other words, are completely submerged in water, or are exposed to the air, in other words, when water is not present on surfaces of the corresponding electrode, even if the level of the water is changed, the area of the electrode that is exposed to the air may not be immediately changed. Accordingly, in this case, the variation X in the electrode output value may not be changed to the predetermined threshold value A or greater.

Accordingly, the MCU 110 according to the present disclosure may compare the variation X in the output value of the electrode 100 with the predetermined threshold value A, and accordingly, may determine whether an actual water surface is positioned in the range of the corresponding electrode (between bottom and top heights of the corresponding electrode).

The threshold value A may be a value selected based on variation of an output value of a corresponding electrode when a water level is changed based on the height of an electrode in the capacitive level sensor. Information on the threshold value A may be stored in the MCU. In addition, the predetermined threshold value A may be variably set according to the size of the fuel cell system depending on a measurement unit and accuracy of capacitance.

This comparison between the variation X in the output value of the electrode 100 and the predetermined threshold value A may be based on the fact that the degree by which the measured value of an electrode is changed as water is introduced into the water trap 10 and as the water surface rises is different from the degree by which the measured value of the electrode is changed along with a change in temperature. In other words, when the temperature inside the water trap 10 is a high temperature, the water vapor pressure inside the water trap 10 may be increased, and droplets may be formed on the surface of the electrode 100 of the capacitive level sensor inside the water trap 10 according to the increased water vapor pressure. Accordingly, even if the level of the water does not actually rise to a corresponding height, the electrode on which droplets are formed may output a very low level of output value due to the droplets.

However, a large amount of droplets may be formed in an environment of high temperature and humidity. Accordingly, the variation X in an electrode output value in one electrode may be equal to or greater than the predetermined threshold value A.

Accordingly, according to the present disclosure, to further clarify that the value measured by the capacitive level sensor is based on the actual rise or drop of a water surface, that is, in consideration of all cases in which large amounts of droplets are generated, the variation X in output values between upper and lower electrodes that are disposed adjacent to each other may be compared in order to predict the actual height of the water surface. The upper electrode and/or the lower electrode that are described in the present disclosure are relative concepts, and thus, regarding a plurality of electrodes, an electrode disposed at a relatively upward position may be the upper electrode and an electrode disposed at a relatively downward position may be the lower electrode. Accordingly, for example, electrodes disposed at positions ② to ⑨ of FIG. 1 may be upper or lower electrodes.

FIG. 2 is a diagram showing an output value of the electrode 100, that is, an output value between adjacent electrodes that are disposed at upper and lower portions based on the height of a water surface, according to an embodiment of the present disclosure.

Referring to FIG. 2, when a water surface is positioned below an upper electrode 100T and a lower electrode 100B, the variation X in an electrode output value has a value that is equal to or less than the predetermined threshold value A in both the two electrodes.

When the water surface continuously rises and the actual water surface exceeds the height of a lower end of a lower electrode to reduce an area of the lower electrode, exposed to the air, that is, when the lower electrode sinks under water, the variation X in the output electrode value of the lower electrode may be greater than the predetermined threshold value A. However, in this embodiment, the height of the water surface does not reach the height of an upper electrode, and thus, the variation X in the electrode output value of the upper electrode may be smaller than the predetermined threshold value A.

When the lower electrode is entirely covered with water and the height of the water surface does not yet reach the height of the upper electrode, the variation X in the electrode output values of the upper and lower electrodes may be smaller than the predetermined threshold value A. This embodiment is similar to an initial state (the state in which the height of the water surface does not reach the height of the lowermost end of the lower electrode).

In addition, when the height of the water surface reaches the height of the lowermost end of the upper electrode and the upper electrode begins to sink under the water surface, the variation X in the electrode output value of the upper electrode may be greater than the predetermined threshold value A. In this case, regarding the lower electrode, the electrode entirely sinks under water, and thus, the variation X in the electrode output value of the lower electrode may be smaller than the predetermined threshold value A.

Figure 3:
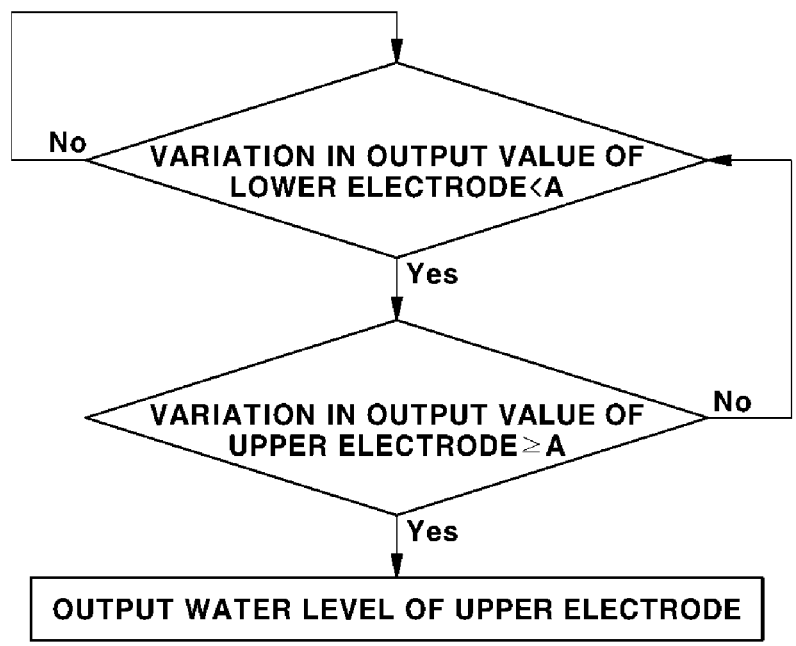
FIG. 3 is a flowchart showing a procedure of outputting the actual height of a water surface when a water surface inside a water trap rises according to an embodiment of the present disclosure.

FIG. 3 is a flowchart showing a procedure of outputting the actual height of a water surface when the water surface inside the water trap 10 rises according to an embodiment of the present disclosure. Referring to FIG. 3, when the water surface rises, first, it may be determined whether the variation X in the electrode output value of the lower electrode is greater than the predetermined threshold value A.

When the variation X in the electrode output value of the lower electrode is greater than the predetermined threshold value A, this variation is indicative of either a large amount of droplets having formed on the corresponding electrode or an actual water surface that is present at the height in the range of the corresponding electrode. Thus, the electrode output value may be compared with an electrode output value of another electrode positioned below the lower electrode to determine whether the reason for the variation is a large amount of droplets or the presence of an actual water surface. In this case, when the actual height of the water surface is determined, the lower electrode may become a new upper electrode and may be used as a determination reference.

On the other hand, when the variation X in the electrode output value of the lower electrode is not greater than the predetermined threshold value A, the variation X in the electrode output value of the upper electrode and the predetermined threshold value A may be compared. In this case, when the variation X in the electrode output value of the upper electrode is equal to or less than the predetermined threshold value A, the actual water surface may be positioned below the lower electrode or at one point between the lower and upper electrodes (which corresponds to the first and third cases of FIG. 2). In addition, when the variation X in the electrode output value of the upper electrode is equal to or greater than the predetermined threshold value A, the actual water surface may be determined to be positioned at one point corresponding to any height between the lower and upper ends of the upper electrode. Accordingly, the MCU 110 may determine the actual height of the water surface based on an output value corresponding to the upper electrode and a water level (the height of a lower end of the upper electrode).

Figure 4:
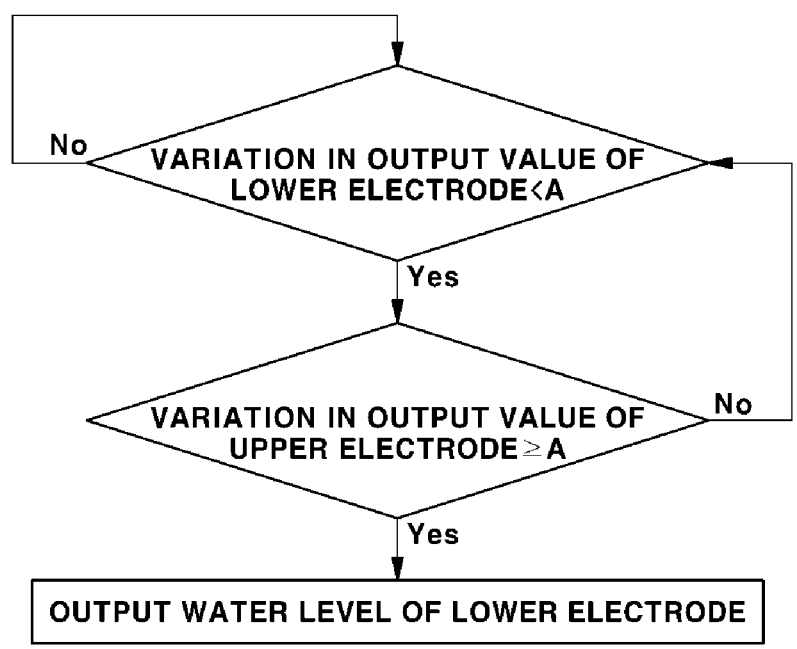
FIG. 4 is a flowchart showing a procedure of outputting the actual height of a water surface when a water surface inside a water trap drops according to another embodiment of the present disclosure.

FIG. 4 is a flowchart showing a procedure of outputting the actual height of the water surface when the water surface inside the water trap 10 drops according to another embodiment of the present disclosure. When the water surface drops, the procedure of outputting the actual height of the water surface may be a determination procedure in which the upper and lower electrodes and the concept of above/below are reversed during a procedure of outputting the height of the water surface when the water surface rises.

Referring to FIG. 4, when the water level drops, first, whether the variation X in the electrode output value of the upper electrode is greater than the predetermined threshold value A may be determined.

When the variation X in the electrode output value of the upper electrode is greater than the predetermined threshold value A, this variation is indicative of either a large amount of droplets having formed in the corresponding electrode or an actual water surface that is present at the height in the range of the corresponding electrode. Thus, the electrode output value may be compared with an electrode output value of another electrode positioned above the upper electrode. In this case, when the actual height of the water surface is determined, the upper electrode may become a new lower electrode and may be a determination reference.

On the other hand, when the variation X in the electrode output value of the upper electrode is not greater than the predetermined threshold value A, the variation X in the electrode output value of the lower electrode and the predetermined threshold value A may be compared. In this case, when the variation X in the electrode output value of the lower electrode is equal to or less than the predetermined threshold value A, an actual water surface may be positioned above the upper electrode or at one point between the upper and lower electrodes (which corresponds to the first and third cases of FIG. 2). In addition, when the variation X in the electrode output value of the lower electrode is equal to or greater than the predetermined threshold value A, the actual water surface may be determined to be positioned at one point corresponding to any height between the upper-most and lowermost ends of the lower electrode. Accordingly, the MCU 110 may determine the actual height of the water surface based on an output value corresponding to the lower electrode and a water level (the height of a lower end of the lower electrode).

Figure 5:
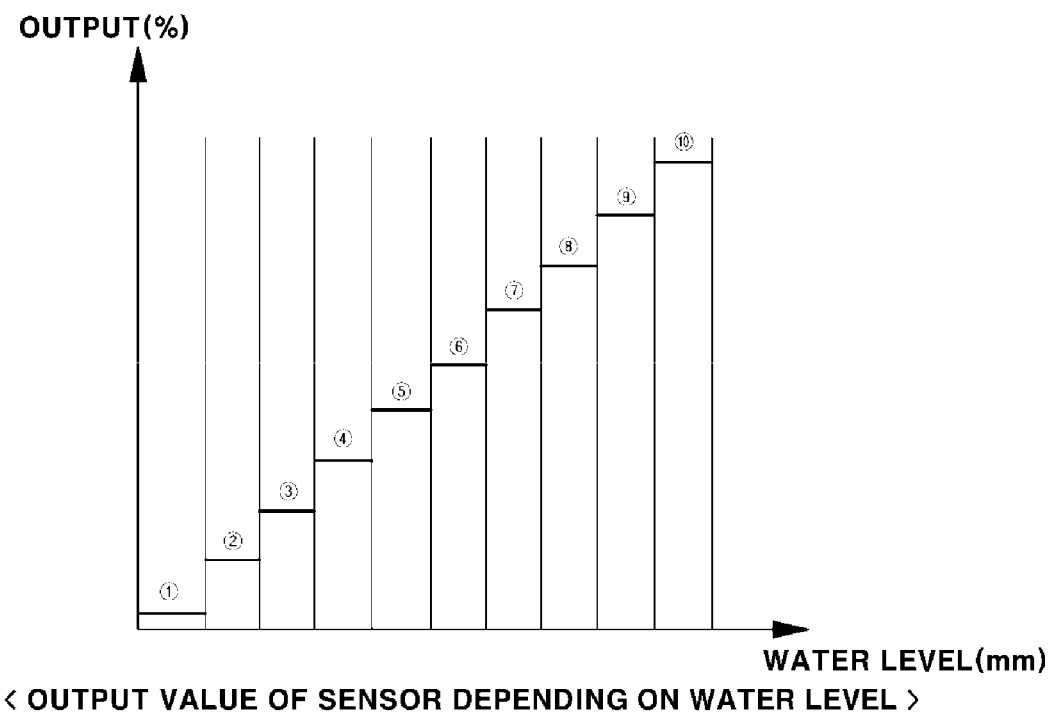
FIG. 5 is a graph showing an output value of a plurality of electrodes according to an embodiment of the present disclosure.

FIG. 5 is a graph showing an output value of the plurality of electrodes 100 according to an embodiment of the present disclosure. FIG. 5 shows a change in an output of an electrode value depending on the height of the water surface. In other words, as seen from FIGS. 1-5, the electrodes disposed at positions ① to ⑩ of FIG. 1 may output predetermined values (values corresponding to heights of lower ends of the corresponding electrodes) and may output the values using the method of outputting a water level of an electrode of FIGS. 3 and 4. Accordingly, the MCU 110 may determine the range of the actual height of the water surface based on the output value of the electrode.

However, as seen from FIG. 5, as described above, according to the present disclosure, a value output from one electrode is a constant output value based on the height of a lower end of a corresponding electrode. In other words, according to the present disclosure, it may be seen that, as the actual water level rises, an output value may be output stepwise.

Because this output form is related to the characteristics of the water trap 10, it may not be required to precisely measure the height of the water surface in the water trap 10. Instead, it may be important to recognize the range in which an actual water surface is positioned in order to determine whether the current time point is a time point at which a drain valve needs to be open.

In other words, a range in which the actual water surface is positioned may be rapidly recognized while reducing the time and procedure for accurately measuring the height of the water surface. When filled with water to a predetermined degree or higher, the object of the water trap 10 is to open a drain valve to discharge water outside. Thus, a capacitive level sensor of the water trap 10 installed in the fuel cell system may require a method and configuration for outputting a water level appropriate for the corresponding object.

According to the present disclosure, a rapid response may be ensured compared with an analog water level sensor. In terms of control of a drain valve, the height corresponding to the actual water level inside the water trap 10 may be accurately determined.

Even if such a method of measuring a water level is used, it may not be possible to completely prevent an error in output of a water level from occurring due to the influence of the temperature. In addition, when water generated from the stack is slowly introduced toward the water trap, variation in an output value during a specific time period may be very small and may not be detected.

According to the present disclosure, to overcome the problems described above, an operation of resetting a reference output value of an electrode may be performed. Then, a variation in the output of each electrode may be checked in order to detect a water level.

In this case, according to an embodiment of the present disclosure, an operation of checking whether the speed at which water is introduced is high may be performed, a threshold value may be determined according to the result of checking. The water level in the water trap may be determined and may be ultimately output depending on the determined threshold value.

Figure 6:
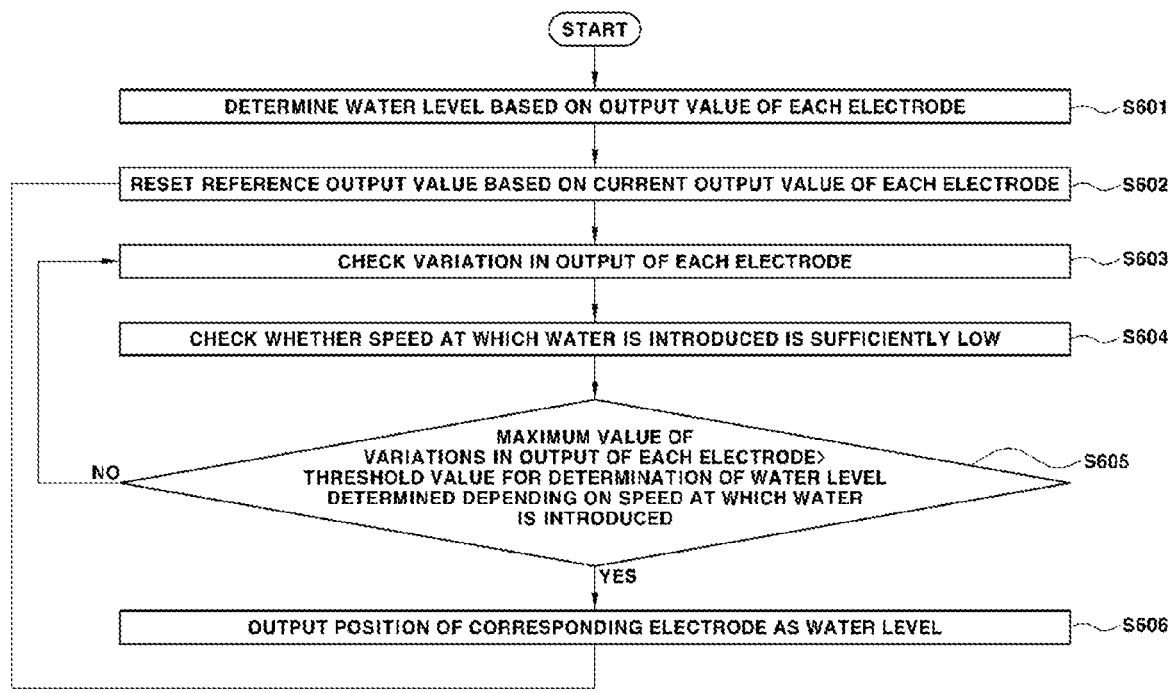
FIG. 6 shows operations of a method of outputting a detected or measured water level of a capacitive level sensor according to an embodiment of the present disclosure.

FIG. 6 shows operations of a method of outputting a detected or measured water level of a capacitive level sensor according to an embodiment of the present disclosure.

As shown in operation S601 of FIG. 6, an operation of determining a water level in a water trap from an output value of each electrode may be performed. The same method as in the description given with reference to FIGS. 2-4 may be applied to the determination of a water level in the present operation.

When the capacitive level sensor shown in FIG. 1 is used, the MCU 110 may receive an output value of each electrode, may calculate the difference between output values of adjacent electrodes, and may detect a water level from the difference value. In other words, the difference between an output value of an adjacent electrode and an output value of an electrode at a position filled with water is relatively increased. Thus, the water level may be determined based on a position of an electrode at which the corresponding difference in output values is maximized. The present operation S601 may correspond to an operation of detecting an initial water level after the vehicle starts. For example, a difference between output values between adjacent upper and lower electrodes may be calculated, and then a maximum value $C_{max}$ with a largest difference may be determined. When the maximum value $C_{max}$ is greater than a predetermined reference value X, the water level may be determined based on the position at which the corresponding maximum value is output. On the other hand, when the maximum value $C_{max}$ is equal to or less than the reference value X, the current water level may be determined based on a predetermined initial value, e.g., a lowest water level. For example, when the difference between output values of sixth and fifth electrodes is maximized, a corresponding water level may be indicated between the sixth and fifth electrodes. In this case, the corresponding water level may be represented as a value related to the height of an electrode.

However, the determination of the water level in operation S601 is not limited to this method, and any method of measuring a water level may be applied without limitation.

Operation S601 may be used to determine an initial water level, and a subsequent operation of outputting a water level may be performed by repeatedly performing operations S602 to S606, as shown in FIG. 6. For example, based on the time at which a vehicle starts, operation S601 may be performed, and then operations S602 to S606 may be repeatedly performed during driving. During driving, when a vehicle stops, the method may be re-performed from operation S601.

When the initial water level is determined, operation S602 of resetting a reference output value of each electrode from the current output value of each electrode may be performed. The present operation S602 may be an operation of resetting the reference output value of each electrode. There through, the influence of a temperature change and the difference between electrodes may be removed. Accordingly, when output variation of an electrode depending on a change in a water level is observed, the influence of temperature change and the difference between electrodes may be excluded from the output variation.

Then, an operation of checking the output variation of each electrode may be performed based on the reset reference output value (S603). In the present operation, similar to the above description, with regard to a specific electrode, the output variation of each electrode may be determined based on the difference between a current electrode output value and a reference output value of a corresponding electrode. In this embodiment, the reference output value of the corresponding electrode may be the reference output value that is reset through operation S602.

Through the above operation, when the output variation of each electrode is checked, an operation of determining a water level based on the output variation of each electrode may be performed. In this regard, according to an embodiment of the present disclosure, a water level determination procedure may be separately performed depending on the speed at which water is introduced.

Accordingly, operation S604 may be performed including checking whether the speed at which water is introduced is high or low, that is, checking whether the speed at which a water level in a water trap is changed is high or low. According to the result, a threshold value for determination of a water level may be set to be changed. For example, when the speed at which water is introduced is low, in other words, when the speed at which a water level in the water trap changes is low, the threshold value for determination of a water level may be set to be a relatively small value. When the speed at which the water is introduced is high, that is, when the speed at which the water level in the water trap changes is high, the threshold value for determination of a water level may be set to be a relatively great value. This is because, when the speed at which water is introduced is high, that is, when a large amount of condensate is generated to thus remarkably change the water level in the water trap, output variation of an electrode is increased. On the other hand, when the speed at which water is introduced is low, the water level in the water trap is slowly changed. Thus, the output variation of the electrode is relatively reduced. Accordingly, when the speed at which water is introduced is low, a relatively small threshold value needs to be applied in order to accurately measure the water level.

Accordingly, in operation S605, the threshold value for determination of a water level may be determined depending on the speed at which water is introduced (the speed at which a water level is changed), and the threshold value may be compared with a maximum value of the output variation of each electrode (S605). As the comparison result, when the maximum value of the output variation is greater than the threshold value, the position of the corresponding electrode, that is, the position of the electrode at which the output variation is maximized, may be output as a water level in the water trap (S606).

In operation S604, whether water introduced into the water trap is rapidly or slowly increased may be determined based on the electrode output variation during a specific unit time in a specific electrode. In other words, when the electrode output variation per unit time in the specific electrode is greater than a predetermined value Y, water may be determined to be relatively rapidly introduced. On the other hand, when the electrode output variation per unit time is equal to or less than the predetermined value Y, water may be determined to be relatively slowly introduced.

In other words, according to the determination result, when the speed at which water is introduced is a low value equal to or less than a reference value, a water level may be determined based on a threshold value W, which is smaller than a predetermined threshold value Z.

To differentiate between the above threshold values, the threshold value Z is referred to as a first threshold value, and the threshold value W is referred to as a second threshold value. The first threshold value may be the same value as the threshold value A described above with reference to FIGS. 3 and 4, and the like. Accordingly, the second threshold value may be set to be a smaller value than the threshold value A. In this case, the second threshold value needs to be set to detect a change in a water level depending on the minimum amount of introduced water under operating conditions. Thus, the second threshold value may be set to detect a change in a water level that occurs when condensate generated in the idle state of a vehicle is introduced into the water trap. Accordingly, the change in a water level in the water trap in the idle state may be checked. The second threshold value may be preset in consideration of the electrode output variation depending on variation in a corresponding water level and may then be stored in the MCU 110.

The first threshold value and the second threshold value, which are different from each other, may be differently applied depending on the speed at which water is introduced, that is, the speed at which a water level in the water trap is changed. Thus, even if the water level increases slowly, the change in the water level may be effectively detected.

Figure 7:
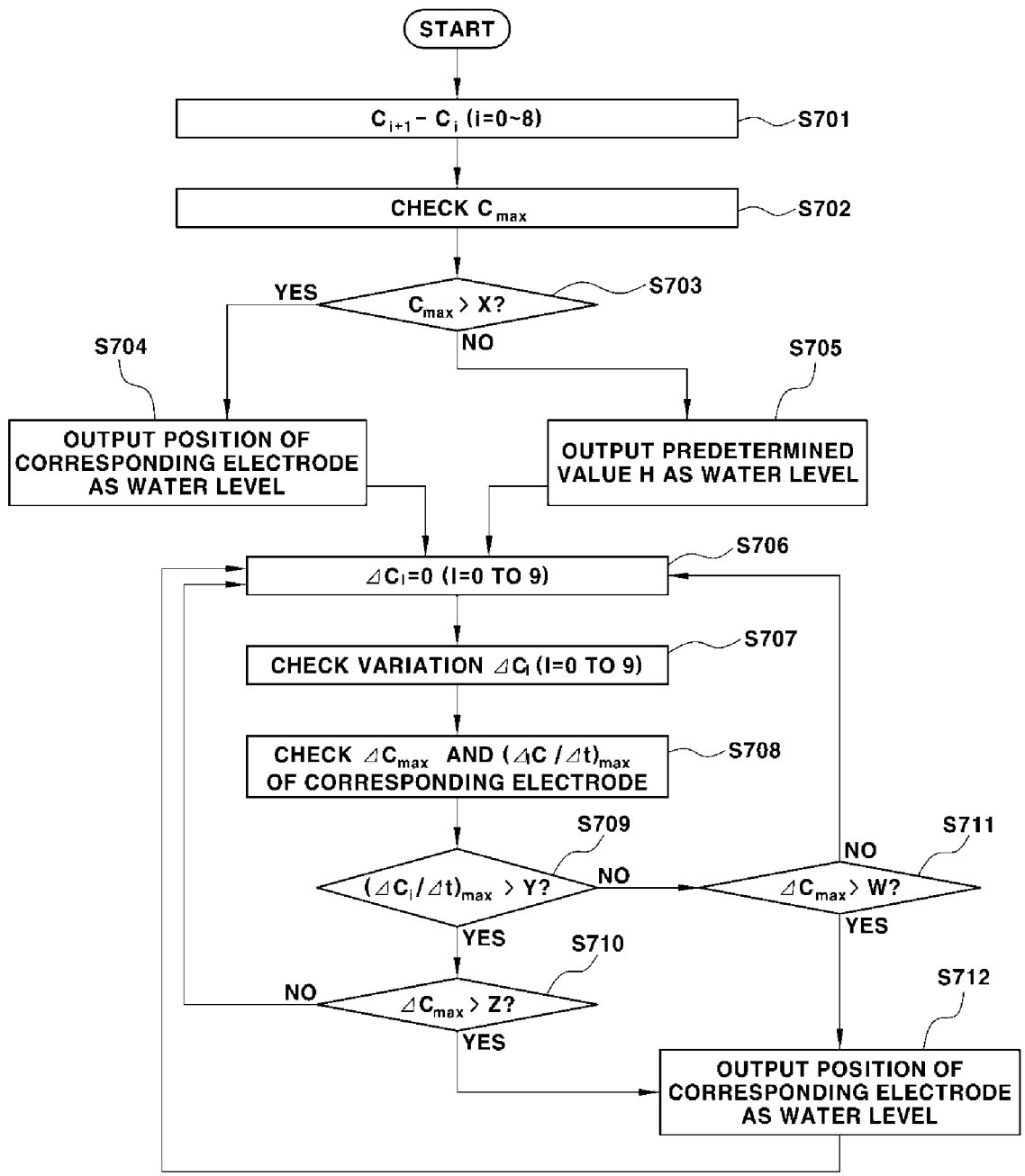
FIG. 7 is a diagram showing a method of outputting a detected or measured water level of a capacitive level sensor according to an embodiment of the present disclosure.

FIG. 7 is a diagram for detailed explanation of the example of FIG. 6 and explains a method of outputting a detected or measured water level of a capacitive level sensor according to an embodiment of the present disclosure.

As shown in FIG. 7, in operation S701, the MCU 110 may receive output values $C_{i+1}$ and $C_i$ of capacitance of adjacent electrodes and may calculate the difference between output values of the adjacent electrodes from the information.

In particular, the present operation S701 may be a pre-operation for detecting an initial water level after vehicle starting and may be an operation in which the MCU 110 receives an output value of each electrode after vehicle starting and calculates the difference between output values of adjacent electrodes. The MCU 110 may collect information on the difference between output values of adjacent upper and lower electrodes, which is calculated in operation S701, may determine the maximum value $C_{max}$ among such difference values (S702), and may use the maximum value $C_{max}$ to detect the initial water level.

In other words, through operation S703, the maximum value $C_{max}$ of the difference between output values of upper and lower electrodes may be compared with the initial reference value X for determination of the initial water level. As a result, when the maximum value $C_{max}$ is greater than the initial reference value X, the position of the corresponding electrode may be output as a current water level (S704). On the other hand, when the maximum value $C_{max}$ is equal to or less than the initial reference value X, a water level may be output as a predetermined value H (S705). In this embodiment, the predetermined value H may refer to the case in which water is never present or is present to a full level. In addition, the predetermined value may be determined using various methods of determining an initial water level with reference to a final water level recorded during earlier driving or through another sensor, and the like.

When the initial water level is determined through operations S704 or S705, the output variation $\Delta C_i$ of an electrode, corresponding to an increase in the capacitance of each electrode, may be reset (S706).

The present operation S706 may correspond to operation S602 of FIG. 6 above. In operation S706, the output variation $\Delta C_i$ of an electrode may be set to "0" based on the current electrode output value, and thus a reference output value may be reset to a current output value of each electrode. Accordingly, as in the present operation S706, only the output variation of an electrode during a short time period after a resetting time point may be checked through an operation of periodically resetting an output variation of an electrode, and there through, a change in the water level may be detected.

Then, the output variation $\Delta C_i$ of each electrode may be newly detected and checked using the reference output value that is reset through operation S707.

Then, an electrode having the maximum value $\Delta C_{max}$ among output variations of electrodes may be checked, a maximum value $(\Delta C_i/\Delta t)_{max}$ of output variation of an electrode per unit time of the corresponding electrode may be checked (S708), and the maximum value $(\Delta C_i/\Delta t)_{max}$ may be compared with a predetermined value Y to determine the speed at which water is introduced (S709).

In particular, in operations S708 and S709, the maximum value $(\Delta C_i/\Delta t)_{max}$ of the output variation of the electrode per unit time of the corresponding electrode may be checked and may be compared with the predetermined value Y in order to check how fast water is introduced into the water trap. Through the operations, selective determination may be possible depending on whether capacitance output of a sensor is changed due to temperature. The selective determination may be possible since, when the output variation of an electrode per unit time is high, the water level is determined to be changed by water level. On the other hand, when the output variation of the electrode per unit time is low, an output of an electrode is changed due to a temperature change, and thus, additional determination thereof may be required.

According to an embodiment of the present disclosure, when the output variation of the electrode per unit time is small, different threshold values for respective operations may be applied in order to determine whether the output of the electrode is changed due to the actual introduction of water.

When the maximum value $(\Delta C_i/\Delta t)_{max}$ of the output variation of the electrode per unit time of the corresponding electrode is greater than the predetermined value Y, water is introduced into the water trap at a relatively high speed. On the other hand, so when the maximum value $(\Delta C_i/\Delta t)_{max}$ of the output variation of the electrode per unit time of the corresponding electrode is equal to or less than the predetermined value Y, water may be introduced into the water trap at a relatively low speed or the output of the electrode may be changed due to temperature.

Accordingly, through operations S708 and S709, upon determining that water is rapidly introduced, the normal first threshold value Z may be compared with the maximum value $\Delta C_{max}$ among output variations of electrodes (S710). Upon determining that water is slowly introduced, the second threshold value W, which is smaller than the first threshold value Z, may be compared with the maximum value $\Delta C_{max}$ among the output variations of electrodes to effectively and separately detect that a small change in a water level due to water occurs and that a change in the output of an electrode due to temperature occurs (S711).

As the comparison result, when the maximum value $\Delta C_{max}$ among the output variations of electrodes is smaller than the first threshold value Z or the second threshold value W, it is deemed that a change in a water level due to water does not occur. Thus, the method may return to operation S706 to repeatedly perform operations S706 to S709.

A corresponding electrode position may be output as a current water level only when the maximum value $\Delta C_{max}$ among the output variations of electrodes is greater than the first threshold value Z or the second threshold value W (S712).

As described above, the second threshold value W may be set to a smaller value than the first threshold value Z. The second threshold value W needs to be set to differentiate between sensor output variation depending on a temperature change and needs to be set to detect a change in a water level depending on the lowest amount of generated condensate. The second threshold value W may be determined depending on the amount of a portion of the condensate generated in an idle state of a vehicle, which is introduced into the water trap, and may be a value for detecting a change in a water level along with the introduction of condensate.

Through the operation, water level information may be updated to the position determined through operation S712. To re-detect a change in a water level, a control logic may be configured in such a way that the method returns to operation S706.

Through the above method, a water measurement error due to a temperature and electrode difference may be prevented. Even if the speed at which water is introduced is sufficiently low, a change in a water level may be accurately detected in order to accurately detect the water level.

Through the above solutions, the present disclosure may have the following effects.

According to the present disclosure, the height of a water level may be accurately determined using a capacitive level sensor even in a state in which the internal temperature of a water trap is high.

A temperature sensor, which is conventionally included in the water trap in consideration of the potential for malfunction due to a high-temperature state inside the water trap, may be obviated. Accordingly, the configuration of a fuel cell water trap may be simplified.

According to the present disclosure, compared with the case in which a water trap employs a water level sensor using an analog method, rapid response to measurement of a water level may be ensured. Thus, a drain valve may be opened at an appropriate time point in order to discharge water outside. Accordingly, the fuel cell system or the stack may be prevented from being damaged by excessively generated water due to an incorrectly measured water level.

In addition, according to the present disclosure, even if a water level is slowly changed as water is slowly introduced into the water trap, the current water level may be accurately detected.

The disclosure has been described in detail with reference to various embodiments thereof. However, it will be appreciated by those of ordinary skill in the art that addition, changes, deletion, or combinations may be made in these embodiments without departing from the principles and spirit of the disclosure, the scope of which is defined in the appended claims and their equivalents.

In the description of the present disclosure, a detailed description of known functions and configurations incorporated herein are omitted when it may make the subject matter of the present disclosure unclear. The terms used in the specification are defined in consideration of functions used in the present disclosure and can be changed according to the intent or conventionally used methods of clients, operators, and users. Accordingly, definitions of the terms should be understood based on the entire description of the present specification. Accordingly, the above description of the present disclosure should not be construed as limited to the embodiments set forth herein and the appended claims should be construed as including other embodiments.

What is claimed is:

1. A method of outputting a detected water level of a capacitive level sensor, the capacitive level sensor having a plurality of electrodes for measuring capacitance, the method comprising:

receiving an output value of each electrode of the plurality of electrodes and determining an initial water level in a water trap from the output value of each electrode, by a controller;

resetting a reference output value of each electrode to a current output value of each electrode, by the controller;

checking output variation of each electrode depending on the reset reference output value, by the controller;

checking a maximum value $\Delta C_{max}$ among output variations of each electrode and comparing the maximum value $\Delta C_{max}$ among output variations of each electrode with a threshold value, by the controller; and outputting a corresponding electrode position as a water level when the maximum value $\Delta C_{max}$ among output variations of each electrode is greater than the threshold value, by the controller, wherein the threshold value is differently set to a first threshold value applied when a water level in the water trap is relatively rapidly changed and a second threshold value applied when the water level in the water trap is relatively slowly changed.

2. The method of claim 1, wherein, when whether the water level in the water trap is relatively rapidly or slowly changed is checked, the controller selects an electrode from the plurality of electrodes with maximum electrode output variation, compares electrode output variation per unit time of the selected electrode with a predetermined value Y, and when the electrode output variation per unit time is greater than the predetermined value Y, the controller determines that the water level in the water trap is relatively rapidly changed, and when the electrode output variation per unit time is equal to or less than the predetermined value Y, the controller determines that the water level in the water trap is relatively slowly changed.

3. The method of claim 1, wherein, when the maximum value $\Delta C_{max}$ among output variations of each electrode is equal to or less than the threshold value, the water level is not determined to be changed, and the method returns to the resetting the reference output value of each electrode to the current output value of each electrode.

4. The method of claim 1, wherein, after the outputting the corresponding electrode position as the water level when the maximum value $\Delta C_{max}$ among output variations of each electrode is greater than the threshold value, operations subsequent to the resetting the reference output value of each electrode to the current output value of each electrode are repeatedly performed.

5. The method of claim 1, wherein the determining the initial water level in the water trap includes:

calculating differences between output values of adjacent upper and lower electrodes of the plurality of electrodes from an output value of each electrode after vehicle starting;

determining a maximum value $C_{max}$ among the calculated differences between the output values of the adjacent upper and lower electrodes; and comparing the maximum value $C_{max}$ among the differences between the output values of the adjacent upper and lower electrodes with a predetermined initial reference value X, and when the maximum value $C_{max}$ among the differences between the output values of the adjacent upper and lower electrodes is greater than the initial reference value X, outputting a corresponding electrode position as a current water level.

6. The method of claim 1, wherein the second threshold value is set to a smaller value than the first threshold value.

7. The method of claim 6, wherein the second threshold value is set to detect a change in a water level, which occurs as condensate generated in an idle state of a vehicle is introduced into the water trap.

* * * * *